United States Patent
Langner et al.

(10) Patent No.: US 8,284,007 B1
(45) Date of Patent: Oct. 9, 2012

(54) MAGNETIC PACKAGE FOR A COMMUNICATION SYSTEM

(75) Inventors: Paul Langner, Fremont, CA (US); Ramin Farjadrad, Los Altos, CA (US); Ramin Shirani, Morgan Hill, CA (US); Jerry A. Martinson, Campbell, CA (US); Thomas Wayne Gandy, Mountain View, CA (US)

(73) Assignee: Aquantia Corporation, Milpitas, CA (US)

( * ) Notice: Subject to any disclaimer, the term of this patent is extended or adjusted under 35 U.S.C. 154(b) by 222 days.

(21) Appl. No.: 12/604,343

(22) Filed: Oct. 22, 2009

Related U.S. Application Data

(63) Continuation of application No. 12/551,326, filed on Aug. 31, 2009, now abandoned.

(60) Provisional application No. 61/173,394, filed on Apr. 28, 2009, provisional application No. 61/141,640, filed on Dec. 30, 2008, provisional application No. 61/141,639, filed on Dec. 30, 2008, provisional application No. 61/099,979, filed on Sep. 25, 2008.

(51) Int. Cl.
*H01F 21/02* (2006.01)
*H01F 27/28* (2006.01)
*H04M 9/08* (2006.01)
*H04B 3/28* (2006.01)
*H04B 3/00* (2006.01)
*H04B 1/00* (2006.01)
*H03H 7/00* (2006.01)
*G01R 15/18* (2006.01)
*G01R 19/22* (2006.01)

(52) U.S. Cl. ............... 336/145; 336/182; 379/406.01; 333/12; 333/177; 324/117 R; 324/118; 375/258; 375/346

(58) Field of Classification Search .............. 336/145, 336/182, 65, 90; 333/12, 177; 324/117 R, 324/118; 375/258, 346; 379/406.01
See application file for complete search history.

(56) References Cited

U.S. PATENT DOCUMENTS

| | | | | |
|---|---|---|---|---|
| 3,506,906 A | * | 4/1970 | Nestor | ............. 361/45 |
| 3,671,859 A | * | 6/1972 | Miller | .......... 324/76.73 |
| 5,832,032 A | | 11/1998 | Overbury | |
| 5,995,566 A | | 11/1999 | Rickard et al. | |
| 5,995,567 A | | 11/1999 | Cioffi et al. | |

(Continued)

FOREIGN PATENT DOCUMENTS
WO    WO 97/40587    10/1997

OTHER PUBLICATIONS
U.S. Appl. No. 12/563,938, filed Sep. 21, 2009, Sedarat.

(Continued)

*Primary Examiner* — Elvin G Enad
*Assistant Examiner* — Tsz Chan
(74) *Attorney, Agent, or Firm* — Lance M. Kreisman, Esq.; Mahamedi Paradice Kreisman LLP

(57) ABSTRACT

A magnetic package for a communication system is disclosed the package comprises a plurality of transformers, wherein each transformer comprises a differential transformer. Each differential transformer comprises at least 2 sets of three pins. Each transformer is coupled to a twisted pair channel and a transceiver. The magnetic package includes at least one common mode transformer coupled to at least one of the transformers, wherein the at least one common mode transformer includes at least three pins. The at least three pins for the at least one common mode transformer are in a position relative to the other pins such that the package size is minimized.

20 Claims, 9 Drawing Sheets

U.S. PATENT DOCUMENTS

| | | | |
|---|---|---|---|
| 6,052,420 | A | 4/2000 | Yeap |
| 6,385,315 | B1 | 5/2002 | Viadella et al. |
| 6,690,739 | B1 | 2/2004 | Mui |
| 6,711,207 | B1 | 3/2004 | Amrany et al. |
| 6,734,659 | B1 * | 5/2004 | Fortner ............... 324/117 R |
| 6,924,724 | B2 * | 8/2005 | Grilo et al. ............... 336/145 |
| 6,959,056 | B2 | 10/2005 | Yeap et al. |
| 7,026,730 | B1 * | 4/2006 | Marshall et al. ........... 307/147 |
| 7,123,117 | B2 | 10/2006 | Chen et al. |
| 7,200,180 | B2 | 4/2007 | Verbin et al. |
| 7,315,592 | B2 | 1/2008 | Tsatsanis et al. |
| RE40,149 | E | 3/2008 | Vitenberg |
| 7,492,840 | B2 | 2/2009 | Chan |
| 7,656,956 | B2 | 2/2010 | King |
| 7,708,595 | B2 | 5/2010 | Chow et al. |
| 2003/0186591 | A1 | 10/2003 | Jensen et al. |
| 2003/0223505 | A1 | 12/2003 | Verbin et al. |
| 2004/0023631 | A1 | 2/2004 | Deutsch et al. |
| 2004/0239465 | A1 * | 12/2004 | Chen et al. ............... 336/173 |
| 2005/0025266 | A1 | 2/2005 | Chan |
| 2005/0053229 | A1 * | 3/2005 | Tsatsanis et al. ........ 379/406.01 |
| 2006/0159186 | A1 * | 7/2006 | King ............... 375/258 |
| 2007/0081475 | A1 | 4/2007 | Telado et al. |
| 2007/0192505 | A1 | 8/2007 | Dalmia |
| 2008/0089433 | A1 | 4/2008 | Cho et al. |
| 2009/0097401 | A1 | 4/2009 | Diab |
| 2009/0154455 | A1 | 6/2009 | Diab |
| 2010/0046543 | A1 | 2/2010 | Parnaby |
| 2010/0111202 | A1 | 5/2010 | Schley-May et al. |

OTHER PUBLICATIONS

U.S. Appl. No. 12/604,323, filed Oct. 22, 2009, Sedarat et al.
U.S. Appl. No. 12/604,351, filed Oct. 22, 2009, Sedarat et al.
U.S. Appl. No. 12/604,358, filed Oct. 22, 2009, Sedarat et al.
U.S. Appl. No. 12/977,844, filed Dec. 23, 2010, Sedarat.

* cited by examiner

MAGNETIC PACKAGE FOR A COMMUNICATION SYSTEM

CROSS REFERENCE TO RELATED APPLICATIONS

This application is a continuation of U.S. patent application Ser. No. 12/551,326, filed Aug. 31, 2009, which claims the benefit of U.S. Provisional Application No. 61/099,979, filed Sep. 25, 2008, entitled, "Interference Cancellation In 10gbase-T And Other Multi Channel Communication Systems," which are incorporated herein by reference in their entireties.

This application claims the benefit of:

U.S. Provisional Application No. 61/141,640, filed Dec. 30, 2008, entitled, "Methods and Apparatus to Detect Common Mode Signal in Wireline Communication Systems";

U.S. Provisional Application No. 61/141,639, filed Dec. 30, 2008, "Methods and Apparatus to Detect Common Mode Signal in Wireline Communication Systems";

U.S. Provisional Application No. 61/173,394, filed Apr. 28, 2009, entitled, "Integrated Common-Mode Transformer for Detection of Electromagnetic Interference on the Channel";

all of which are incorporated herein by reference in their entireties.

This application is related to:

U.S. patent application Ser. No. 12/604,351, entitled, "Rejecting RF Interference in Communication Systems," filed concurrently herewith and assigned to the assignee of the present invention;

U.S. patent application Ser. No. 12/604,323, entitled, "A Common Mode Detector for a Communication System," filed concurrently herewith and assigned to the assignee of the present invention;

U.S. patent application Ser. No. 12/604,358, entitled, "Fast Retraining for Transceivers in Communication Systems," filed concurrently herewith and assigned to the assignee of the present invention;

U.S. patent application Ser. No. 12/551,210, entitled, "Rejecting RF Interference in Communication Systems," filed Aug. 31, 2009 and assigned to the assignee of the present invention;

U.S. Provisional Application No. 61/153,440, filed Feb. 18, 2009, entitled, "Methods of Rejecting RF Interference in 10GBase-T Communication Systems";

U.S. patent application Ser. No. 12/551,340, entitled, "A Common Mode Detector for a Communication System," filed Aug. 31, 2009 and assigned to the assignee of the present invention;

U.S. patent application Ser. No. 12/551,347, entitled, "Fast Retraining for Transceivers in Communication Systems," filed Aug. 31, 2009 and assigned to the assignee of the present invention;

U.S. Provisional Application No. 61/148,112, filed Jan. 29, 2009, entitled, "Fast Retrain to In Decision-Directed Communication Systems";

U.S. patent application Ser. No. 12/563,938, entitled, "Cancellation of Alien Interference in Communication Systems," filed Sep. 21, 2009 and assigned to the assignee of the present invention;

U.S. patent application Ser. No. 12/551,396, entitled, "Cancellation of Alien Interference in Communication Systems," filed Aug. 31, 2009 and assigned to the assignee of the present invention;

all of which are incorporated herein by reference in their entireties.

FIELD OF THE INVENTION

The present invention relates generally to communication systems and more specifically to a magnetic package for a communication system.

BACKGROUND OF THE INVENTION

In wireline communication systems, the data is encoded on a modulated signal which is typically transmitted differentially over a pair of wires. In such systems, the common component of the differential signal on the two wires does not carry any information and it is typically noise from electromagnetic interference (EMI) and crosstalk. Examples of wireline communication systems that are susceptible to common mode noise include various flavors of Digital Subscriber Line (DSL) and Ethernet over copper. In these systems the communication medium typically consists of multiple cascaded sections of twisted pair of wires typically terminated with transformers at both ends.

FIG. 1 shows a circuit 100 that includes a termination of a twisted pair of wires 110 into a transformer 130. The transformer 130 is coupled to a transceiver 140 and is primarily used for DC isolation and common mode rejection. FIG. 1 also shows a common mode choke 120 which is sometimes included to further block the common mode signal. It also provides proper impedance termination for common mode signal which prevents reflections and standing waves.

In a perfect system, the common mode component is very well balanced and does not convert to a differential signal. However, in any practical system the transversal conversion loss (TCL) is finite which means some portion of the common mode signal shows up as differential noise at the receiver. The imbalance that would cause a finite TCL can be anywhere in the signal path including the wireline channel, the connectors at both end of the channel, and even the components that is used to detect the differential signal. This noise may be a limiting factor in the performance of a wireline communication system. Therefore, it is important to be able to detect the common mode component for characterization purposes as well as potential improvement in the performance. The present invention addresses such a need.

SUMMARY OF THE INVENTION

A magnetic package for a communication system is disclosed the package comprises a plurality of transformers, wherein each transformer comprises a differential transformer. Each differential transformer comprises at least 2 sets of three pins. Each transformer is coupled to a twisted pair channel and a transceiver. The magnetic package includes at least one common mode transformer coupled to at least one of the transformers, wherein the at least one common mode transformer includes at least three pins. The at least three pins for the at least one common mode transformer are in a position relative to the other pins such that the package size is minimized.

Other aspects and advantages of the present invention will become apparent from the following detailed description, taken in conjunction with the accompanying drawings, illustrating by way of example the principles of the invention.

DETAILED DESCRIPTION

The present invention relates generally to communication systems and more specifically to a magnetic package for a communication system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A circuit for a wireline system is disclosed. In an embodiment, the circuit includes a twisted pair channel. The twisted pair channel delivers a differential signal that includes a converter mode component. The circuit includes at least one transformer coupled to the twisted pair channel and a transceiver coupled to the at least one transformer. The circuit further includes a common mode detection coupled to the transceiver for detecting a common mode component. In an embodiment, the circuit detects the common mode component. Accordingly, with common mode component detection capability, the common mode component of the differential can be analyzed for characterization purposes as well as for potential improvement in the system performance signal.

Other aspects and advantages of the present invention will become apparent from the following detailed description, taken in conjunction with the accompanying drawings, illustrating by way of example the principles of the invention.

Figure 2:
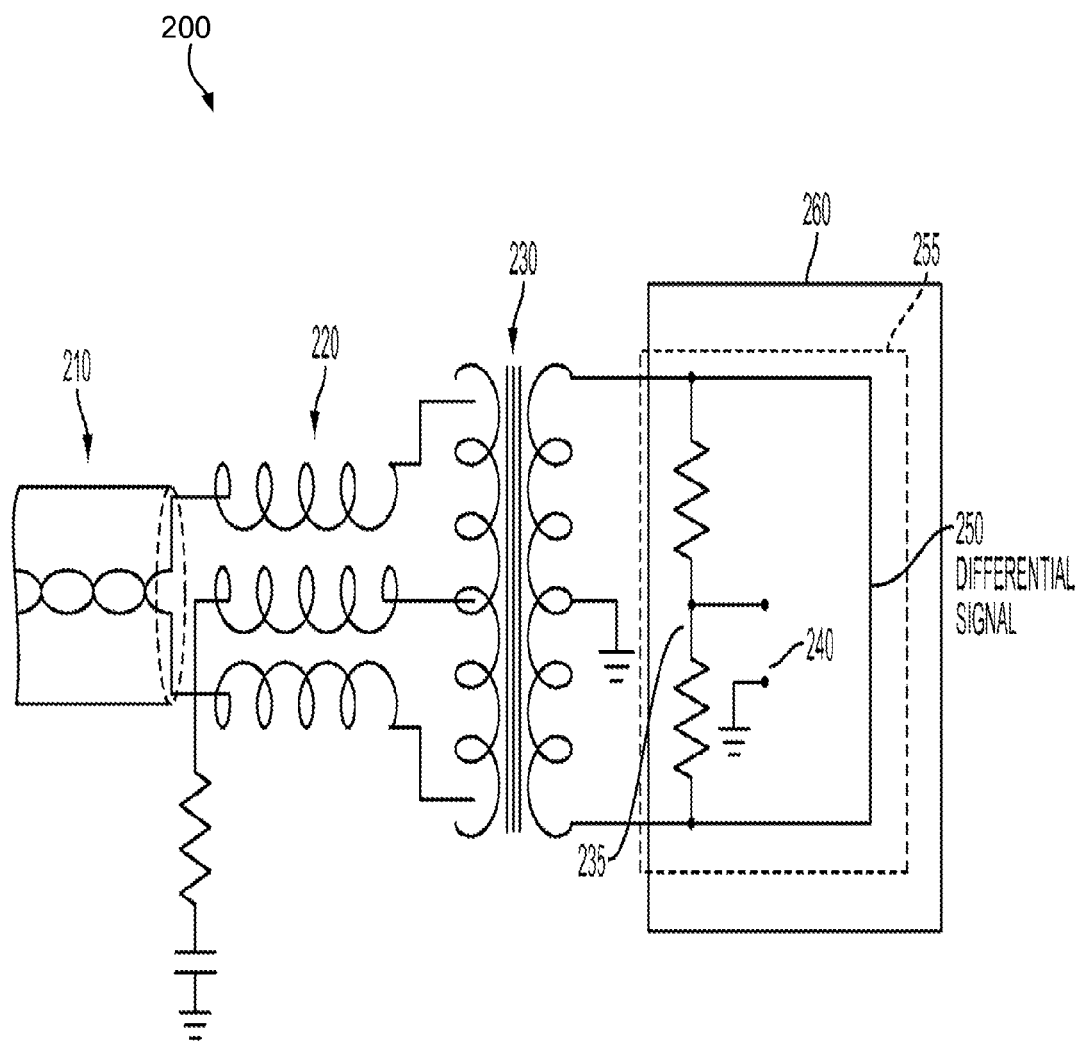
FIG. 2 shows a common mode circuit in accordance with an embodiment of the present invention.

There are a number of ways to sense and measure the common mode component in a transceiver. FIG. 2 shows a circuit 200 in accordance to an embodiment of the present invention. The circuit 200 includes a twisted pair channel 210, a common mode choke 220, a differential transformer 230 and a transceiver 260. The common mode choke 220 is coupled to the twisted pair channel 210 and the differential transformer 230. The differential transformer 230 is coupled to the transceiver 260 via a common mode controller 255.

The twisted pair channel 210 is a form of wiring in which two conductors (the forward and return conductors of a single circuit) are twisted together for the purpose of canceling out electromagnetic interference (EMI) from external sources, for instance, electromagnetic radiation from Unshielded Twisted Pair (UTP) cables, and crosstalk between neighboring pairs.

The common mode detector 255 is shown in the transceiver 260. Here, the common mode component 240 of a differential signal that has leaked into the transceiver 260 is extracted from the differential pair 250. A way to extract the common mode component 240 from a differential pair 250 is to tap the center point of impedance 235 that connects between the pair as shown in FIG. 2. Furthermore, in order to reduce the number of pins going to the chip, the center point of impedance 235 is placed inside of the transceiver 260.

Figure 3:
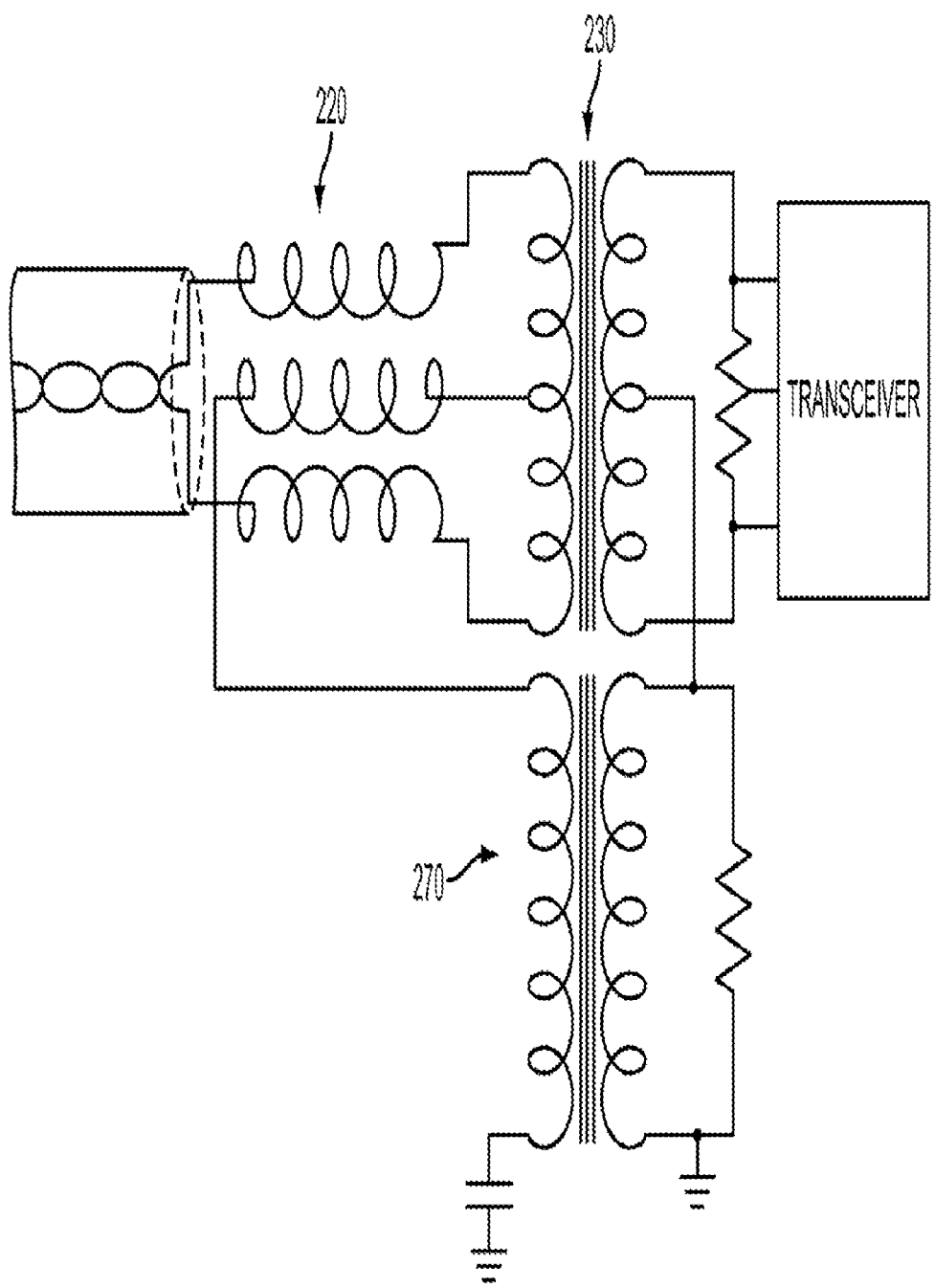
FIG. 3 shown an alternate embodiment of the common mode circuit in accordance with an embodiment of the present invention.

Since the common mode to common mode gain of various components may be independent and different of the common mode to differential gain, there may be a significant common mode component converted to differential signal on the differential pair while the common mode component on the differential pair 250 is negligible. In such cases, the common mode component to noise ratio may not be adequate for proper detection through a circuit similar to what shown in FIG. 2. Accordingly, FIG. 3 illustrates a way to provide a path to inject the common mode component 240 to the transceiver 260. FIG. 3 shows a common mode transformer 270 coupled to the differential transformer 230 and the common mode choke 220 for injecting the common mode component into the differential pair in order to facilitate proper detection.

Figure 4:
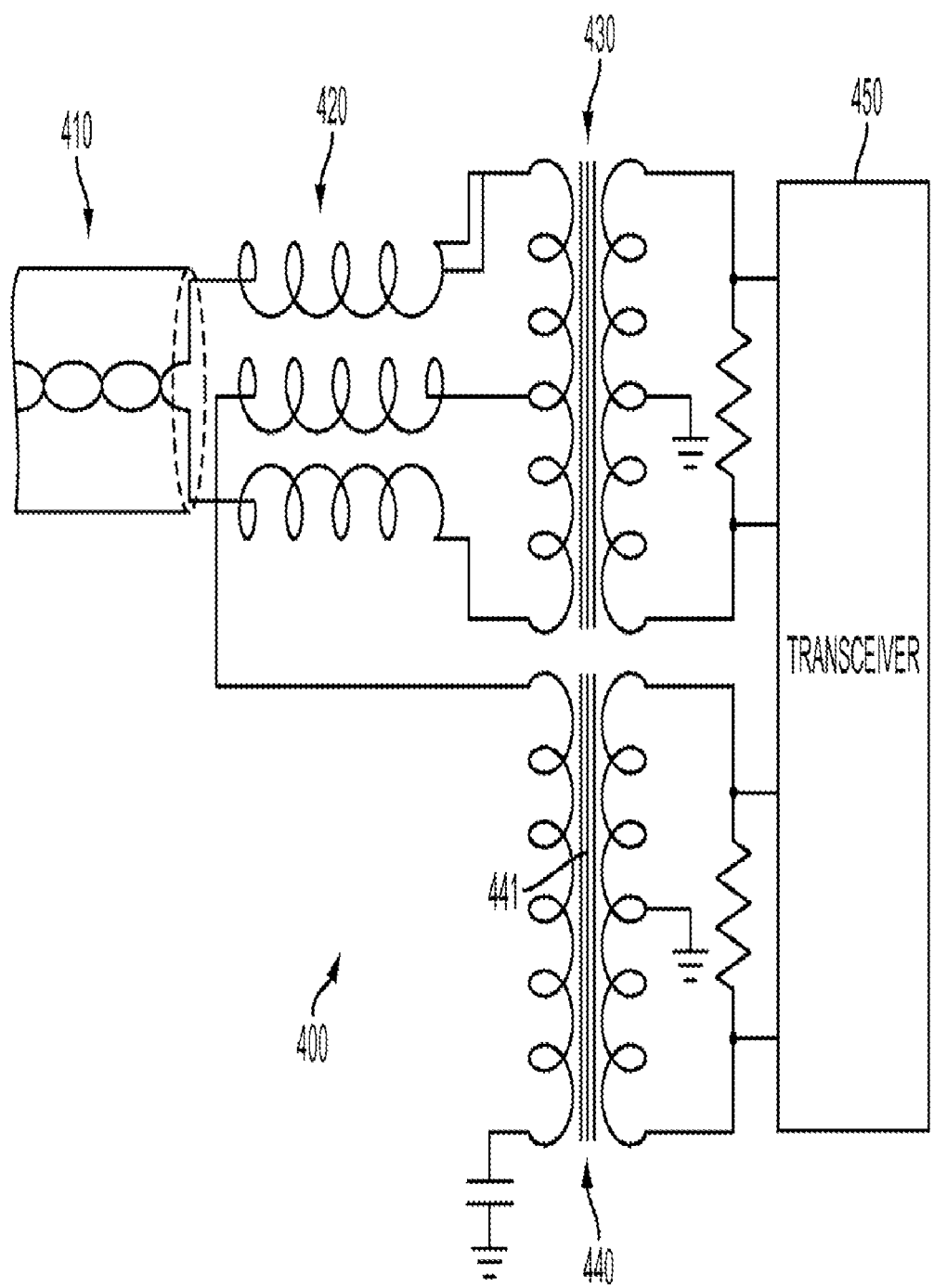
FIG. 4 shows a common mode detection circuit in accordance with an alternate embodiment of the present invention.

Alternatively, FIG. 4 shows a common mode detection circuit 400 in accordance with an alternate embodiment of the present invention whereby a transformer configuration is introduced which provides a means of common mode measurement. The circuit 400 includes a twisted pair channel 410, a common mode choke 420, a differential transformer 430, a common mode transformer 440, and a transceiver 450. The common mode choke 420 is coupled to the twisted pair channel 410 and the differential transformer 430. The differential transformer 430 is coupled to the common mode transformer 440 and the transceiver 450 whereby the common mode transformer 440 is coupled to the transceiver 450. Here the common mode transformer 440 provides for the detection and measurement of the common mode component.

Figure 1:
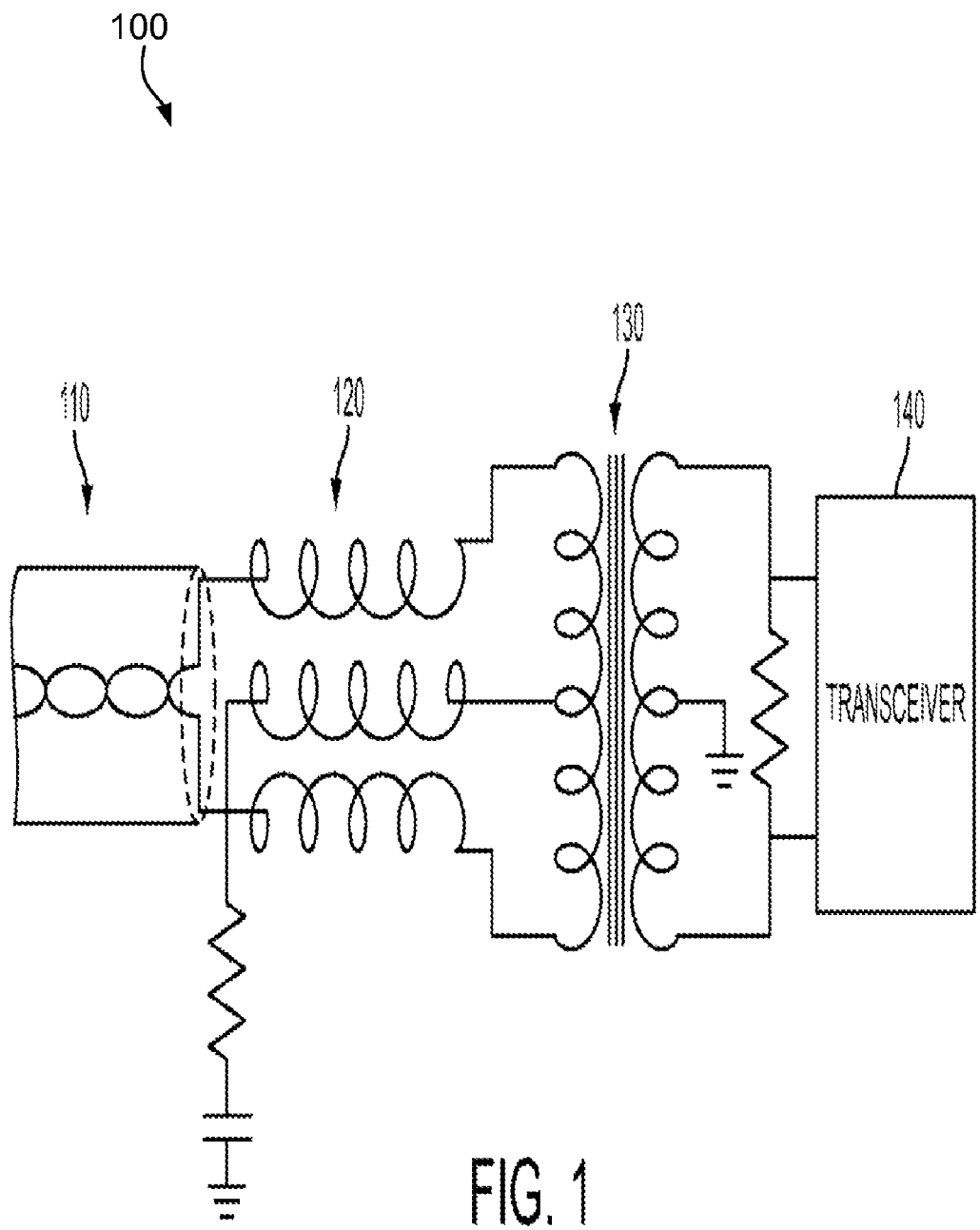
FIG. 1 shows such a termination of a twisted pair into a transformer.

An important consideration with regards to FIG. 4 is the electro-static discharge (ESD) or cable discharge event (CDE). ESD or CDE events result in large common mode voltages in a medium. In the typical case of FIG. 1, the transceiver 140 is isolated from the large common mode voltage on the cable as the transformer 130 rejects most of the common mode component while passing all the differential-mode signal. However, in FIG. 4, the common mode component of the cable side is effectively passed to the transceiver 450, thus becoming vulnerable to ESD/CDE events. To remedy this problem, the common mode transformer 440 is selected such that its core 441 saturates in the presence of large input voltages, basically having a clipping effect, to protect against over voltage. A large input voltage due to electro-static charge accumulated on the cable can reach or exceed few kV (e.g. 2000V).

The addition of this common mode transformer 440 as a discrete component can add a challenge for high density and/or price sensitive systems, making this solution not very attractive from practical implementation and production point of view. A solution to this problem is to integrate this transformer as an additional core to the package of the existing link transformer. In one solution, an existing package will have three additional pins per common mode transformer, two for differential connection of wires and one for center tap of transformer for proper biasing, thereby resulting in some increase in the size of the package with minimal impact on board layout and price.

Figure 6A:
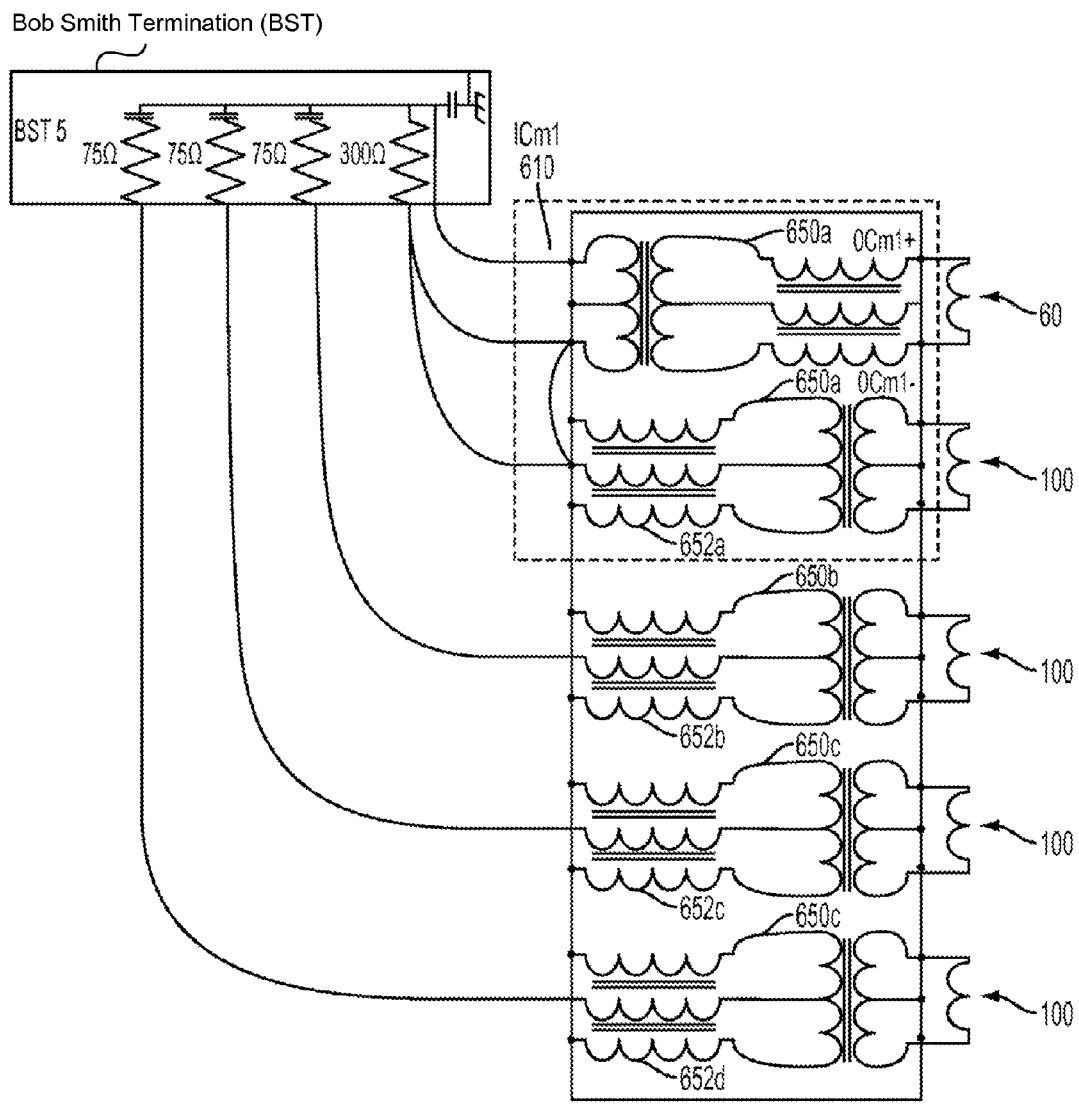
FIG. 6A illustrates a schematic view of a magnetic package with one integrated common mode transformer.

FIG. 6A illustrates a schematic view of a magnetic package with an integrated common mode transformer. For example, in the case of 10 GBASE-T, where there are four pairs and thus four cores that include transformers $650a$-$650d$ and four cores that include chokes 652*a*-652*d*, a total of 8 cores, only one core for the common mode transformer 660 is used to detect the line common mode. This only increases the total size and price of the new component by factor of 9/8 only ~12%. However, there may be requirements for redundancy of this common mode core, which may lead to having 2 such cores and sensing common mode of two of the twisted pairs. In that case, an increase factor of 10/8 or 25% is contemplated.

Figure 5:
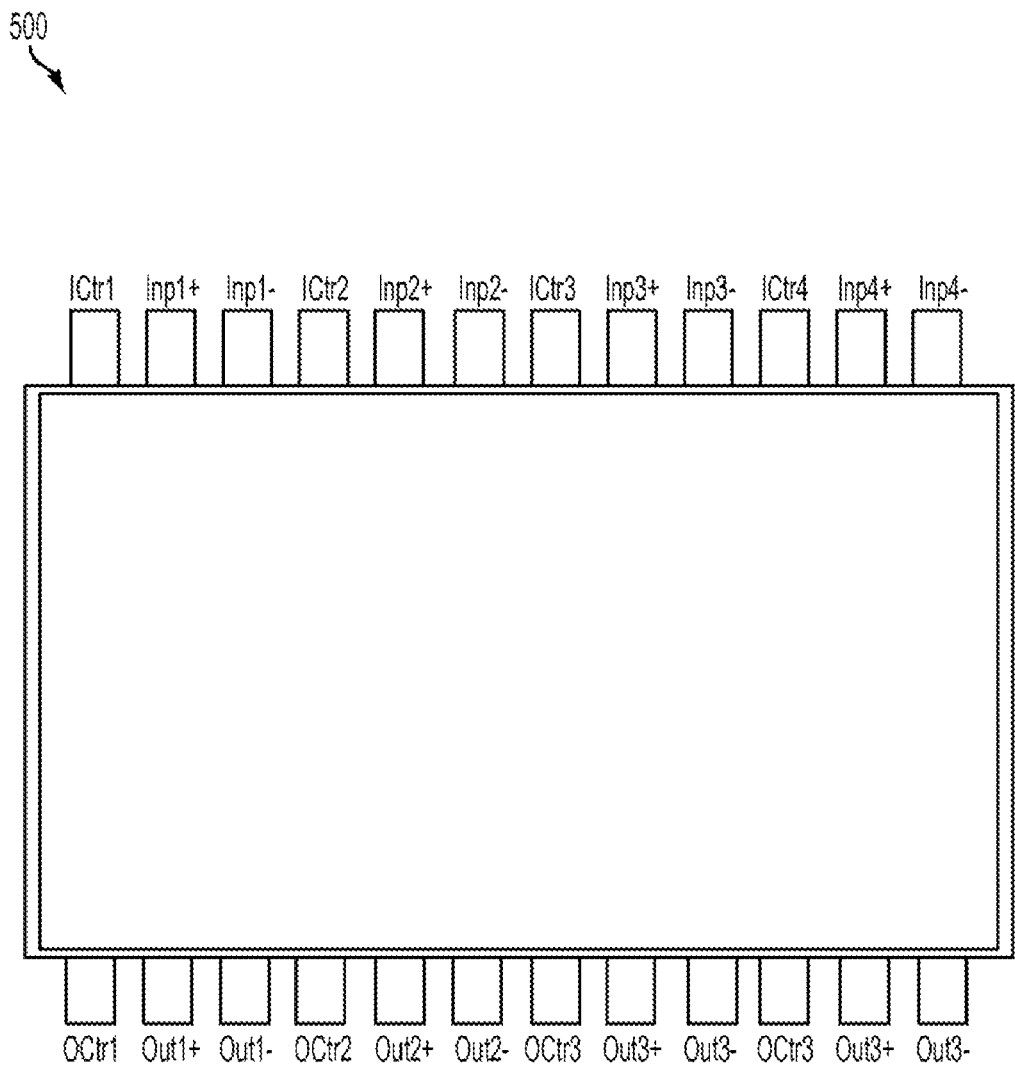
FIG. 5 shows an Ethernet BASE-T (e.g. 10 GBASE-T) magnetic package.
Figure 6B:
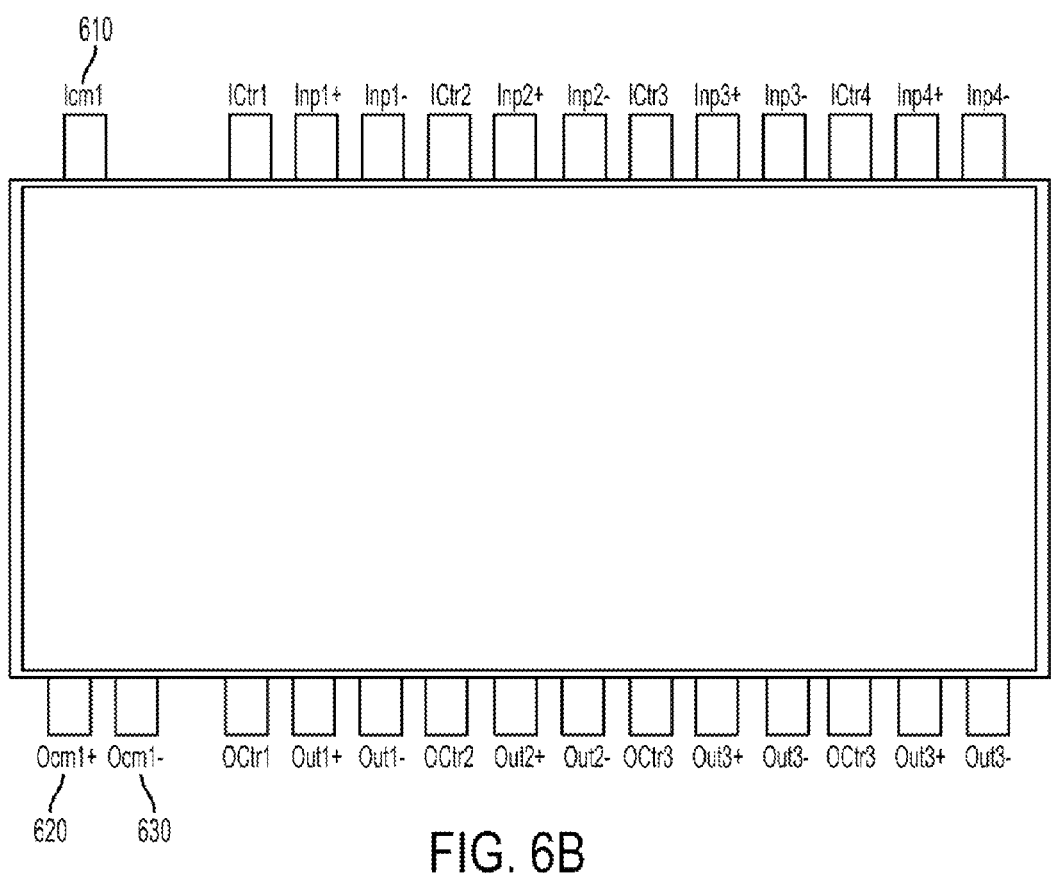
FIG. 6B illustrates a magnetic package with an integrated common mode transformer.
Figure 7:
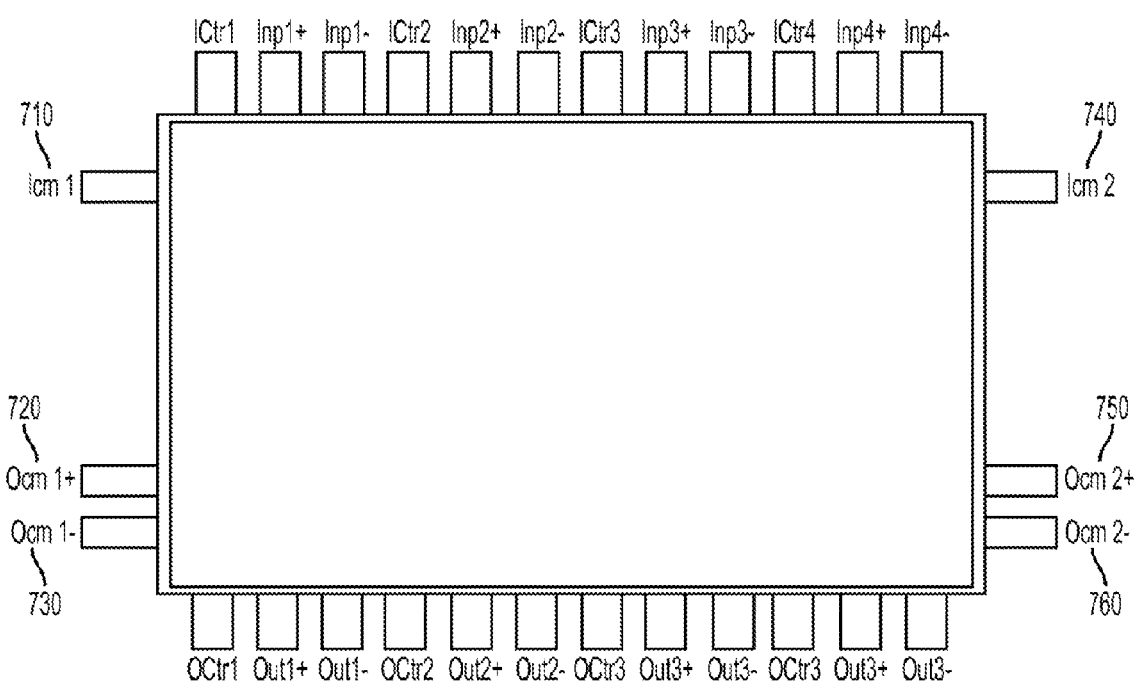
FIG. 7 illustrates a BASE-T magnetic package with two integrated common mode transformers.

FIG. 5 shows an example of an Ethernet BASE-T (e.g. 10GBASE-T) magnetic package 500. Each input and output per pair has three pins, two for differential connection of wires and one for center tap of transformer for proper biasing. For the case of a transformer having one additional common mode transformer, the extra pins (Icm1, Ocm1+, Ocm1−) can be placed on the top and bottom of the package together with the rest of the pins. This can be seen in FIG. 6B which shows the extra pins Icm1 610, Ocm1+ 620 and Ocm1− 630. Of course the extra pins 610, 620, 630 can be placed anywhere on the top and bottom. However, to avoid increasing the package size for extra pins, the additional pins can be placed on the sides, as shown in FIG. 7. FIG. 7 shows the additional pins Icm1 710, Ocm1+ 720, Ocm1− 730 and Icm2 740, Ocm2+ 750, Ocm2− 760 on the sides.

Figure 8:
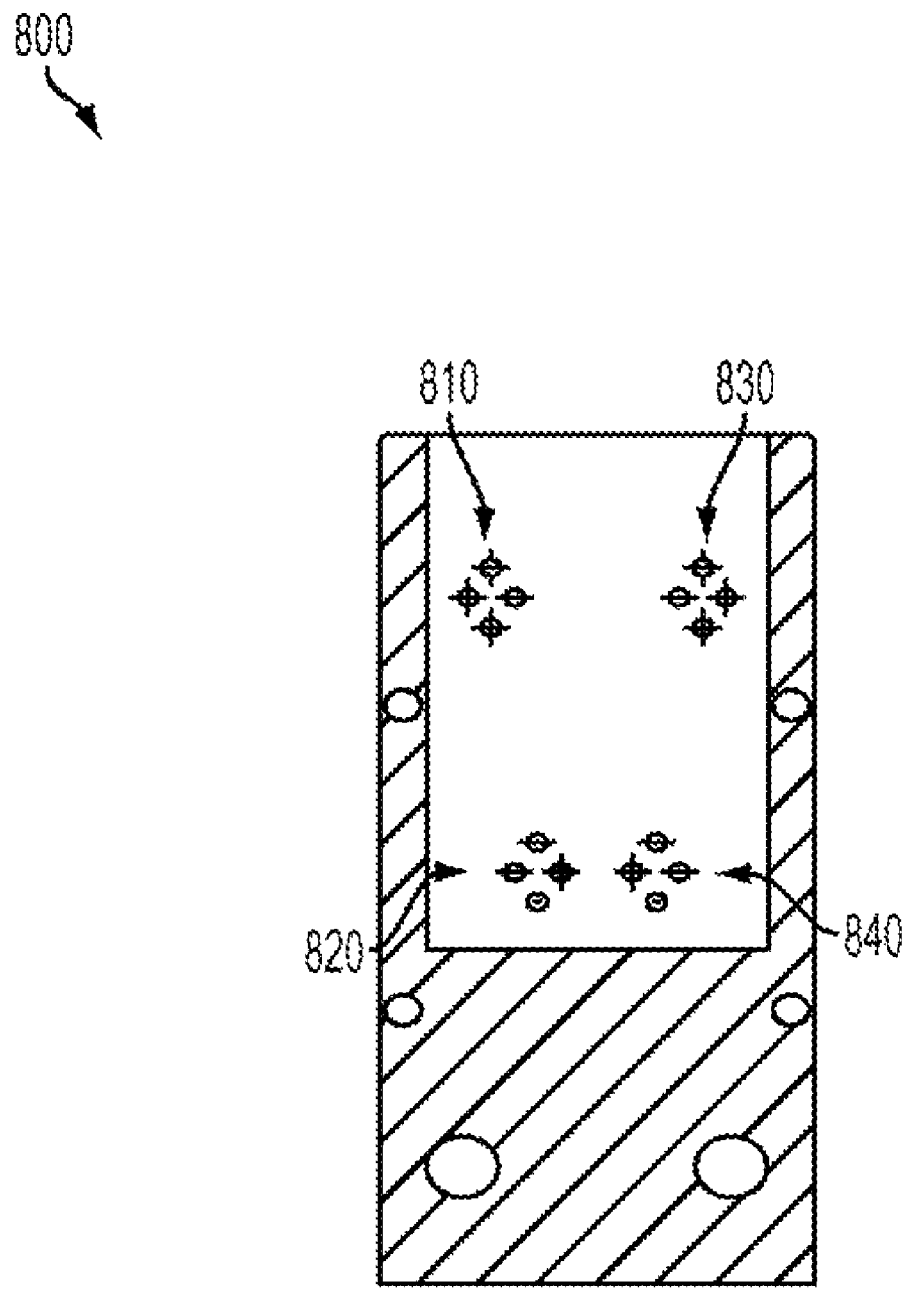
FIG. 8 illustrates a bottom view of a BASE-T ICM package with four groups of pins.

This concept can be applied to Integrated Connector Modules (ICM) that combine a transformer and a connector. In fact the integration of the common mode transformers in the ICM is desirable as the center tap of the transformer in the cable side that carries the common mode component does not come out as a pin in the ICMs and are terminated inside the package. In the case of ICM, signal pins connected to the board are preferably all underneath the package. This is shown in FIG. 8 as the four groups of pins 810, 820, 830, 840 are shown in the bottom view of an ICM 800. It should be noted that two pins of the four pins in the sub groups are differential signals and two are center taps of the same channel. Accordingly, the fifth channel for the common mode transformer output can be placed at the center of the four groups, as an example, and no input will be visible for the common mode transformer in this case.

Referring back to FIG. 4, it should also be mentioned that the center-tap termination for the common mode can be eliminated for the case of having a common mode transformer 440 connected to that center tap, if the other side of the transformer 440 is going to be terminated. Assuming that in most scenarios the center tap termination is different from 50 ohms and in most cases it is easier to have a 50 ohm termination, the transformer primary/secondary ratios can be adjusted to convert 50 ohms to any target value. Consequently, the addition of the common mode transformer 440 does not result in additional board components either.

Additionally, it is envisioned that an implementation of the present invention includes a method of providing for a common mode detection circuit. The method comprises providing for a twisted pair channel, providing for a common mode choke coupled to the twisted pair channel, providing for at least one transformer coupled to the common mode choke, providing for a transceiver coupled to the at least one transformer and providing for a common mode component controller coupled to the at least one transformer and the transceiver.

Varying embodiments of the present invention define a unique common mode detection circuit for a communication system. In an embodiment, the circuit detects the common mode component. Accordingly, with common mode signal detection capability, the common mode component can be analyzed for characterization purposes as well as for potential improvement in the system performance.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An ethernet transformer module comprising:
   a magnetic package;
   at least one differential transformer circuit disposed in the magnetic package and having at least two conductors for coupling to a differential twisted pair channel, the conductors to receive an ethernet differential signal having a common mode component, the at least one differential transformer circuit having output pins for coupling to an ethernet transceiver; and
   a common-mode transformer disposed in the magnetic package and coupled to the at least one differential transformer circuit, the common mode transformer including output pins for coupling to the ethernet transceiver.

2. The ethernet transformer module according to claim 1 wherein:
   the at least one differential transformer circuit comprises a common-mode choke and a differential transformer coupled to the common-mode choke.

3. The ethernet transformer module according to claim 1 wherein:
   the at least one differential transformer circuit comprises four differential transformer circuits.

4. The ethernet transformer module according to claim 3 wherein the magnetic package comprises:
   a first pair of sides having four sets of pins corresponding to the four differential transformer circuits; and
   a second pair of sides having a fifth set of pins corresponding to the common mode transformer.

5. The ethernet transformer module according to claim 4 wherein for the first pair of sides, each of the sets of pins comprise a pair of differential transformer pins and a center tap pin.

6. The ethernet transformer module according to claim 1 wherein for the second pair of sides, the fifth set of pins comprise solely a pair of differential common mode pins.

7. The ethernet transformer module according to claim 1 wherein the at least one differential transformer circuit and the common-mode transformer are integrated with a connector.

8. The ethernet transformer module according to claim 7 wherein the connector is adapted to mount to a board, and wherein the output pins are disposed underneath the magnetic package to engage corresponding pins on the board.

9. The ethernet transformer module according to claim 1 wherein:
   the common-mode transformer includes a termination internal to the module.

10. The ethernet transformer module according to claim 1 wherein the differential transformer includes a center-tap, and the common-mode choke includes:
    a third conductor coupled to the differential transformer center-tap.

11. The ethernet transformer module according to claim 10 wherein:
the common-mode transformer includes a primary winding coupled to the third conductor, and a secondary winding for coupling to the transceiver.

12. The ethernet transformer module according to claim 11 wherein:
the common-mode transformer secondary winding couples to the differential transformer center-tap.

13. The ethernet transformer module according to claim 10 wherein:
the common-mode transformer includes a voltage clipping core.

14. The ethernet transformer module according to claim 1 wherein the conductors are configured as inputs to receive a 10 GBASE-T ethernet signal.

15. The ethernet transformer module according to claim 1 wherein the differential transformers and the common mode transformer are terminated in the magnetic package based on a Bob Smith Termination (BST) network.

16. The ethernet transformer module according to claim 15 wherein a plurality of the differential transformers have respective center-tap series RC terminations including respective termination resistors of 75 ohms.

17. The ethernet transformer module according to claim 16 wherein at least one of the differential transformers have a center-tap coupled to the common-mode transformer and sharing a termination resistor with the common-mode transformer.

18. The ethernet transformer module according to claim 17 wherein the termination resistor forms a series termination for the at least one differential transformer and a parallel termination for the common-mode transformer.

19. The ethernet transformer module according to claim 1 wherein the common-mode transformer includes one pin coupled to a ground potential via a series capacitor.

20. A 10GBASE-T ethernet integrated connector module including:
a magnetic package;
a connector disposed within the magnetic package;
four differential transformers disposed in the magnetic package, each of the transformers having at least two conductors for coupling to a differential twisted pair channel, the conductors to receive a 10GBASE-T ethernet differential signal having a common mode component, each of the transformers having output pins for coupling to a 10GBASE-T ethernet transceiver; and
a common-mode transformer disposed in the magnetic package and coupled to at least one of the differential transformers, the common mode transformer including output pins for coupling to the ethernet transceiver;
wherein the four differential transformers and the common-mode transformer are terminated in the magnetic package by a termination network based on a Bob Smith Termination (BST) network.

* * * * *